Jan. 24, 1928.
H. W. JESPERSEN
1,657,308
MATERIAL REELING MECHANISM
Filed July 6, 1925 6 Sheets-Sheet 2
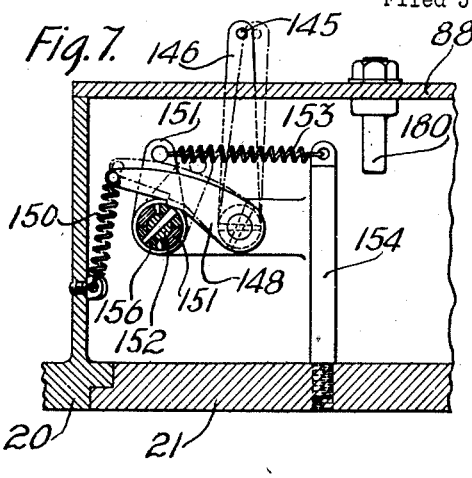
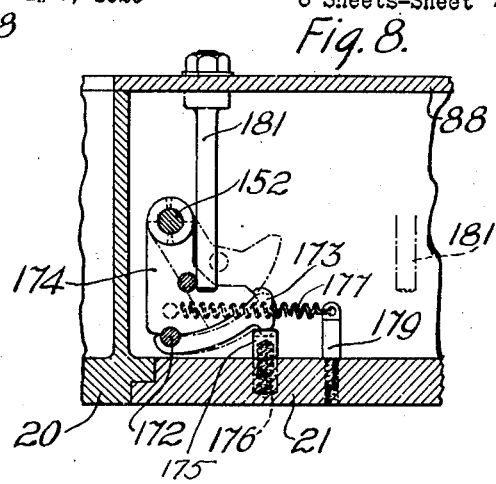
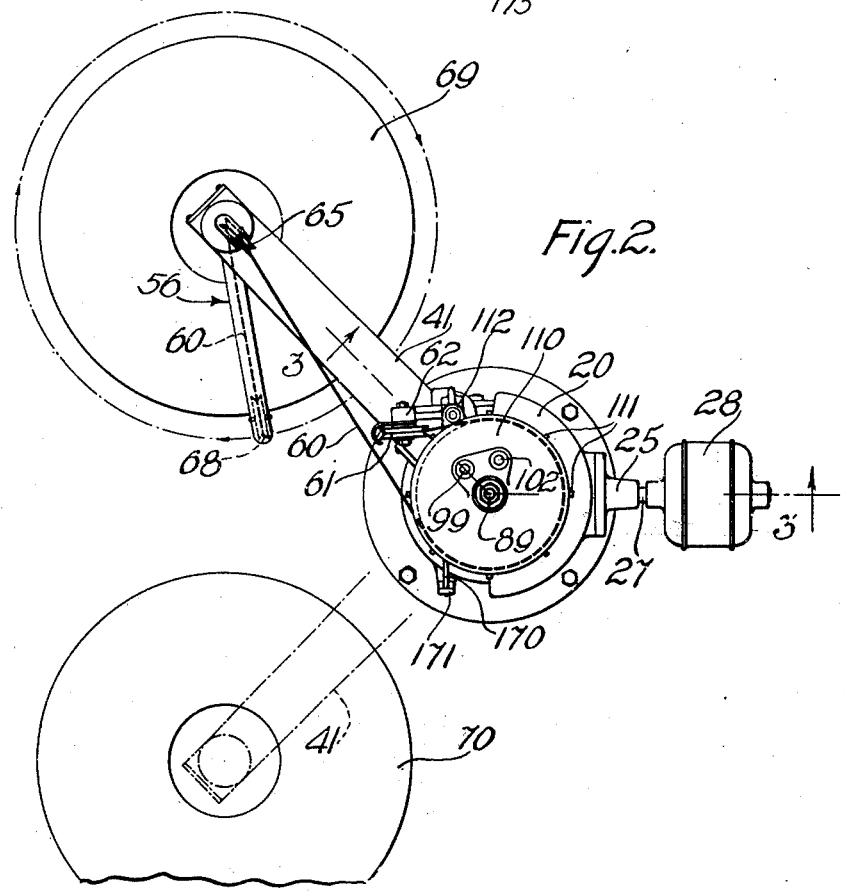
Inventor
Helgo W. Jespersen
by H. A. Tatham Att'y.

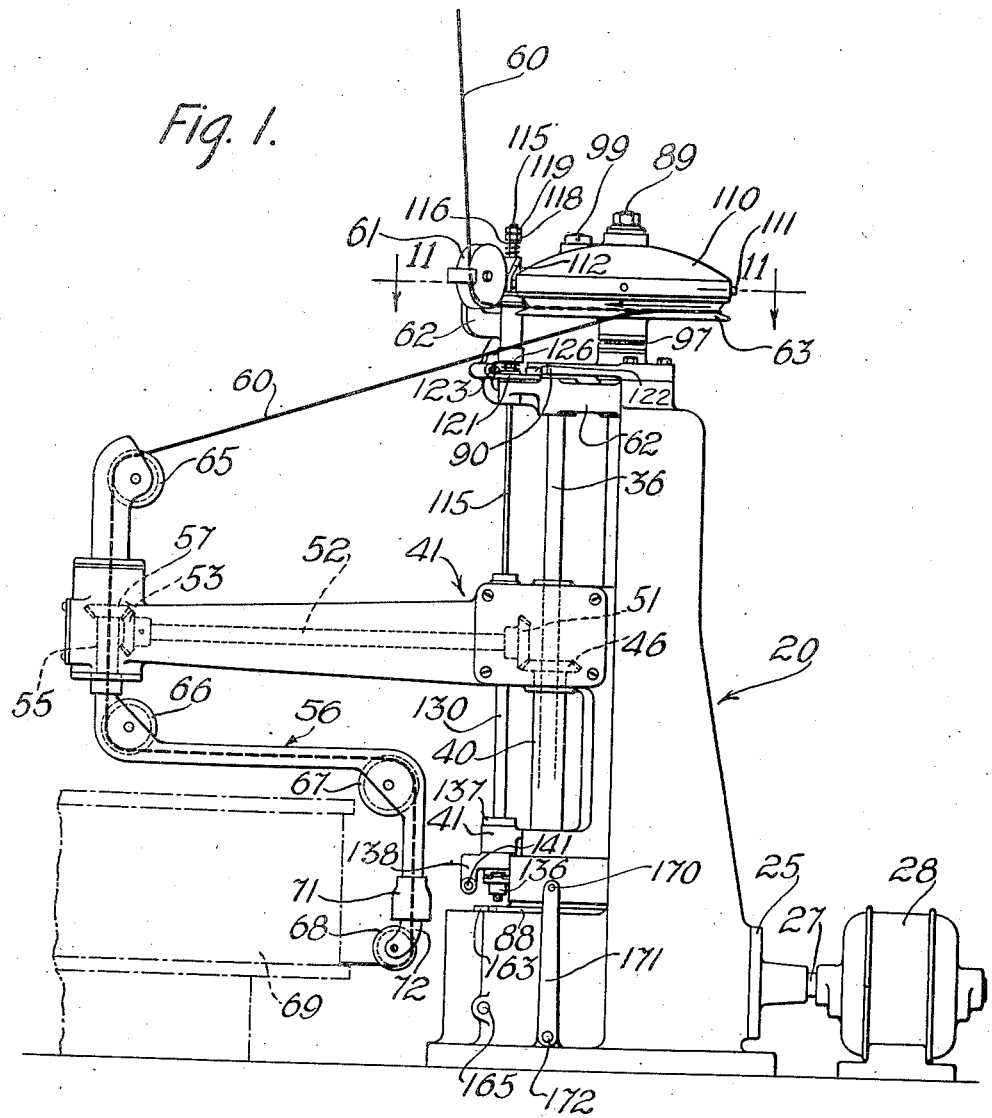

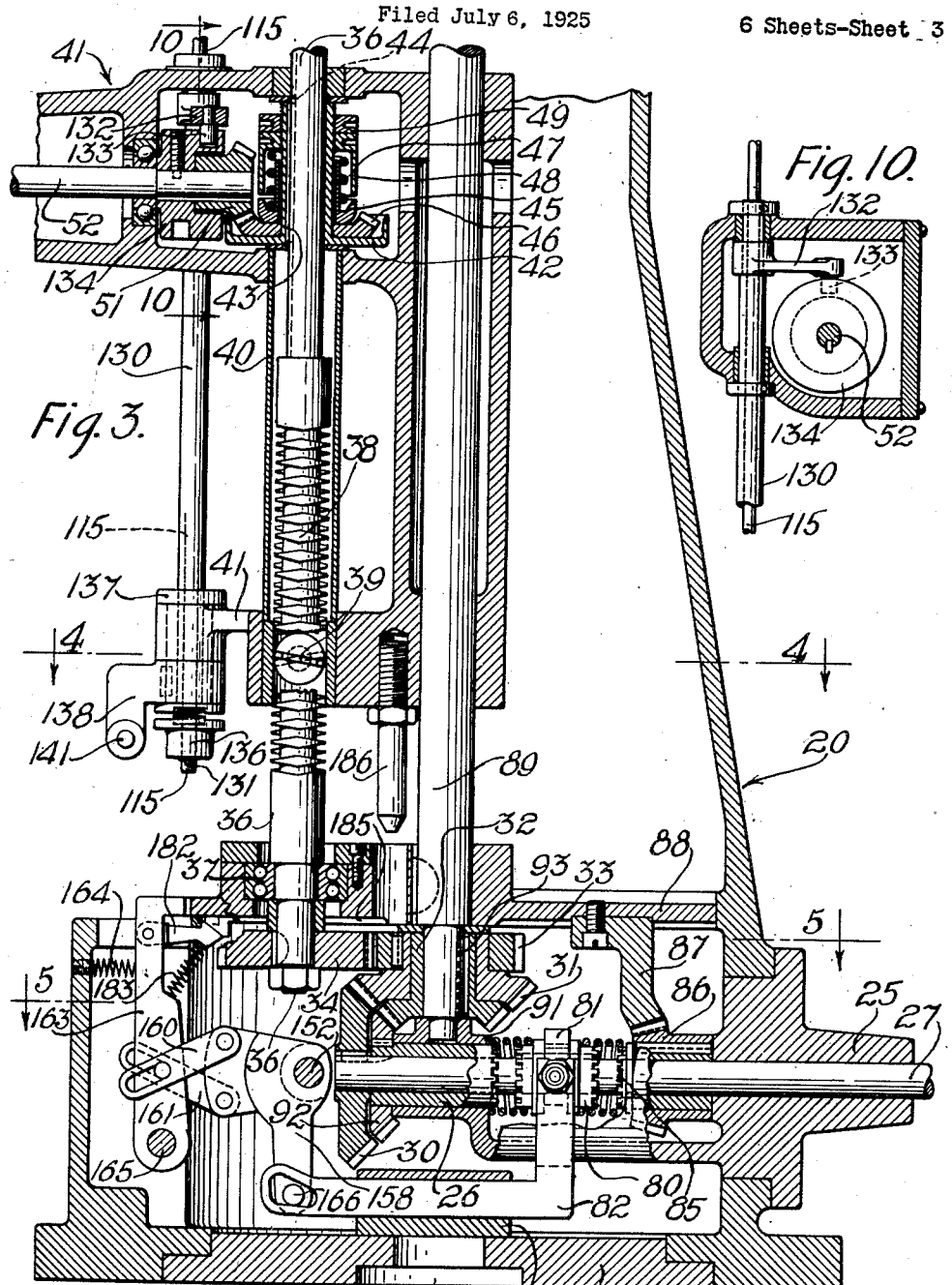

Jan. 24, 1928.
H. W. JESPERSEN
1,657,308
MATERIAL REELING MECHANISM
Filed July 6, 1925
6 Sheets-Sheet 4
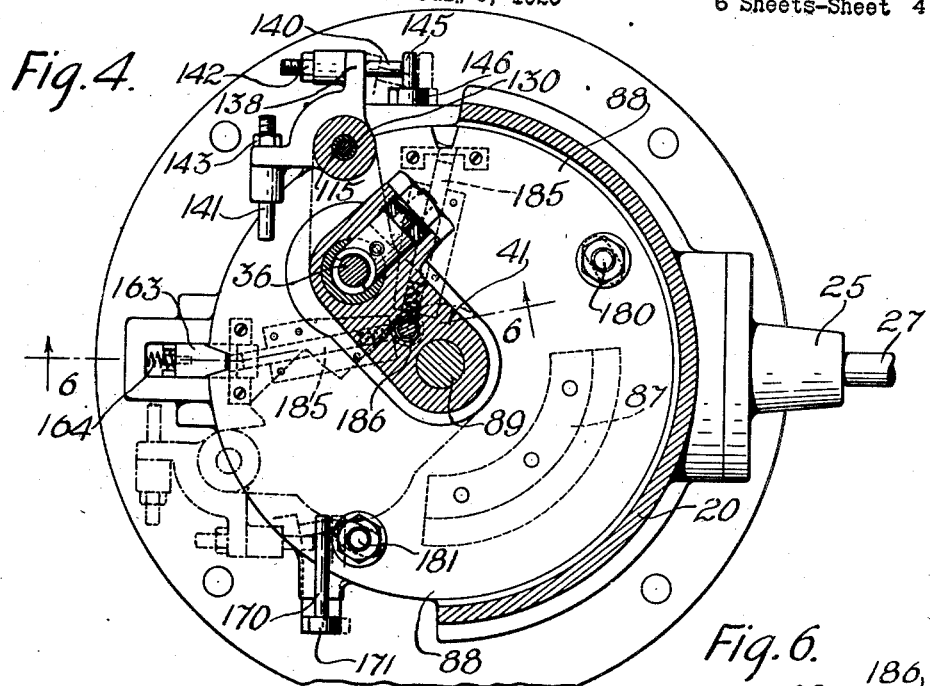
Fig. 4.
Fig. 6.
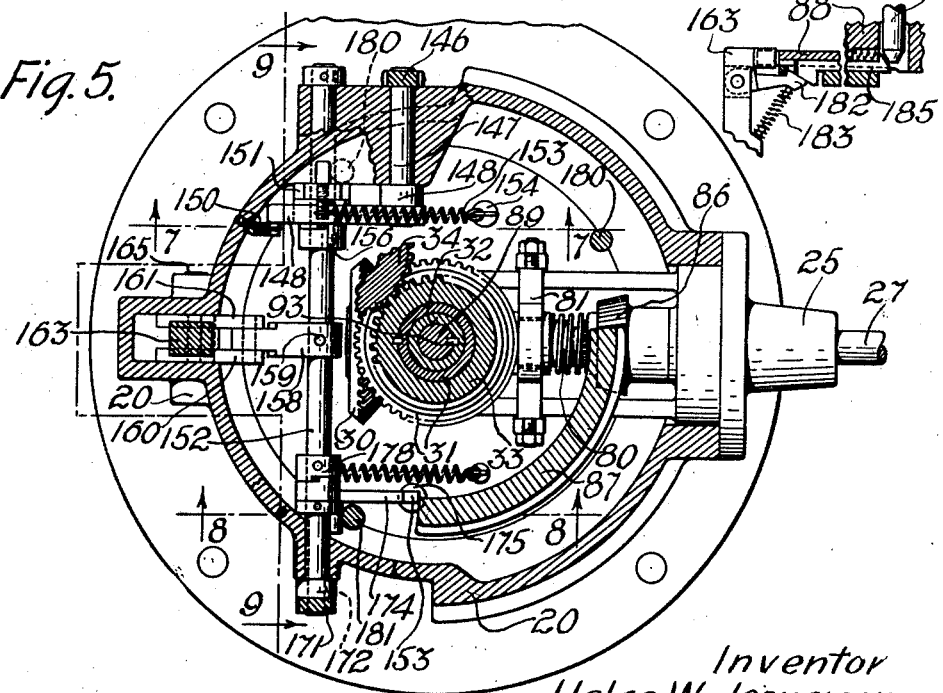
Fig. 5.
Inventor
Helgo W. Jespersen
by
H. A. Vattson.
Att'y.

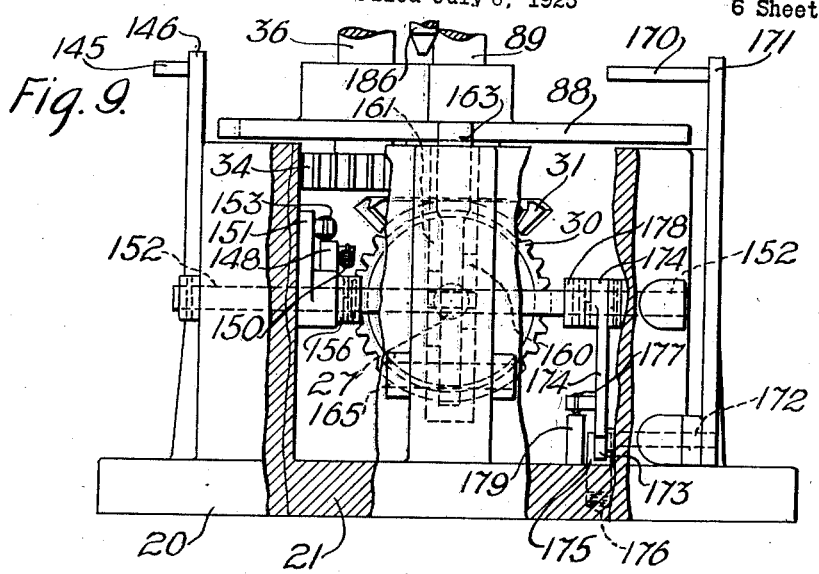
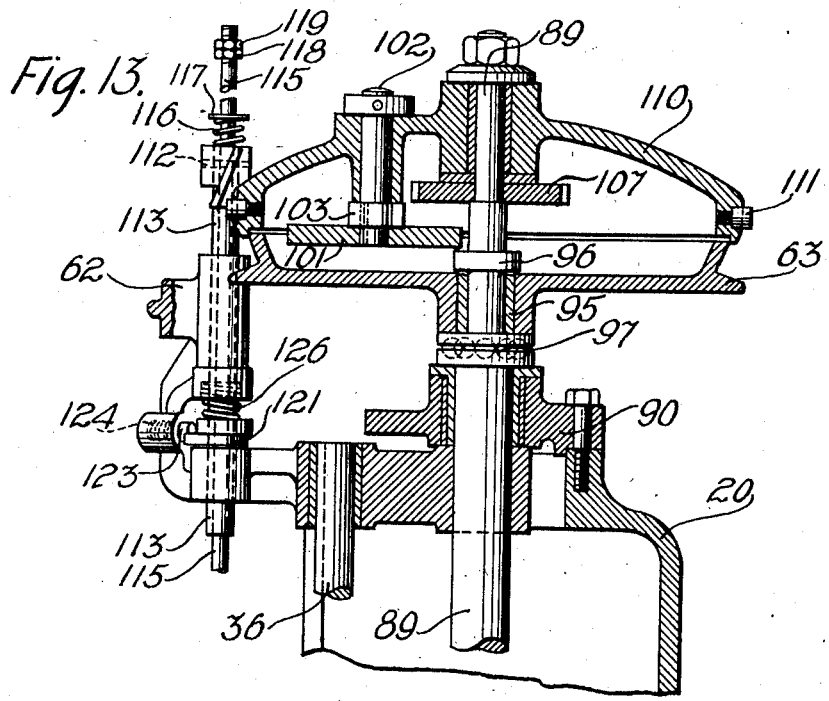

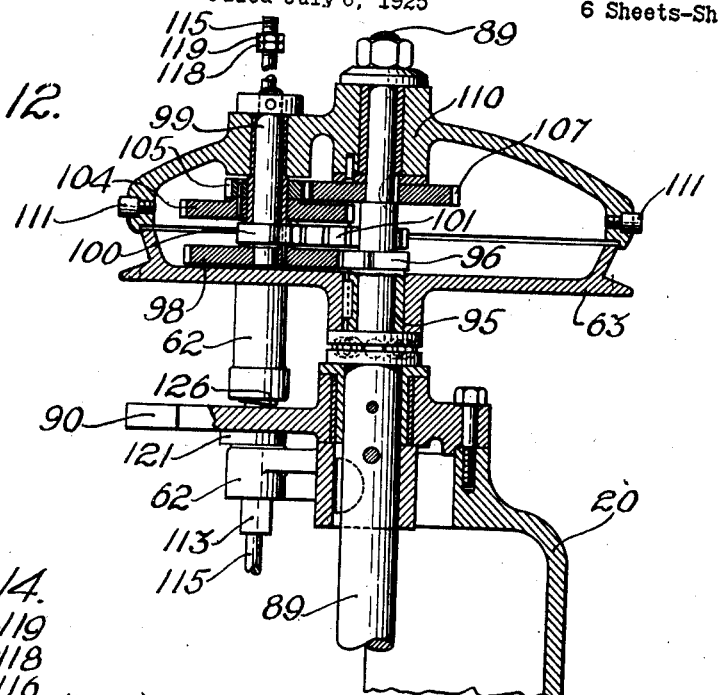
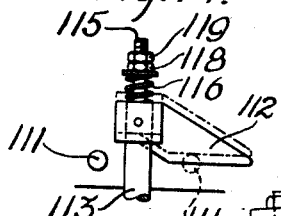
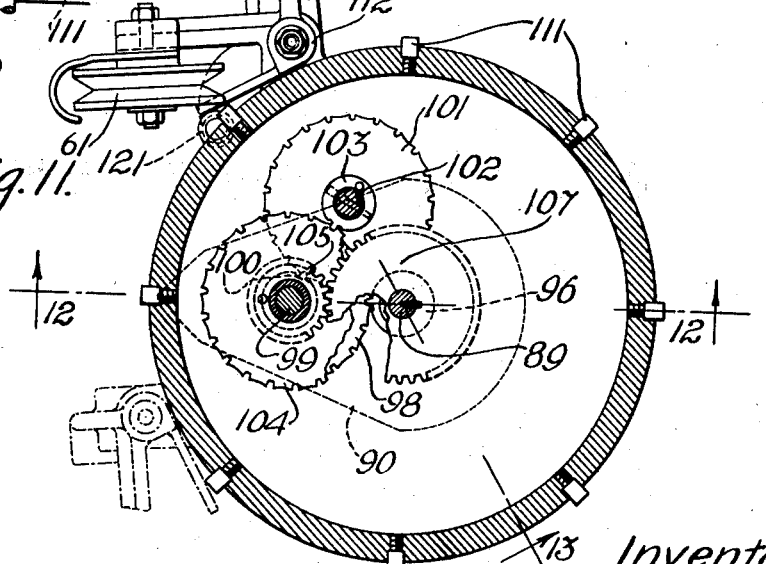

Patented Jan. 24, 1928.

1,657,308

UNITED STATES PATENT OFFICE.

HELGO WIGGO JESPERSEN, OF RIVERSIDE, ILLINOIS, ASSIGNOR TO WESTERN ELECTRIC COMPANY, INCORPORATED, OF NEW YORK, N. Y., A CORPORATION OF NEW YORK.

MATERIAL-REELING MECHANISM.

Application filed July 6, 1925. Serial No. 41,488.

This invention relates to material reeling mechanisms, and more particularly to such mechanisms involving the feature of continuously reeling or winding.

Objects of the invention are to provide in a material reeling mechanism, improved means for measuring the material being guided to and wound and distributed upon a reel by a single means which may rotate around the reel, and means responsive to a predetermined set of conditions for removing the winding means from operative association with the reel or transferring such means to another reel.

According to the above objects, the present invention contemplates the provision of a plurality of stationary reels which are closely associated with mechanism operative in a manner to simultaneously wind and distribute strand material, preferably insulated electrical conductors to the reels separately. This mechanism according to one embodiment of the invention comprises means which is capable of being rotated and reciprocated as the strand material or insulated conductor is drawn to the reeling position. In order to provide continuous operation of the winding and distributing mechanism, means is arranged to be operated when a predetermined length of strand material has been wound on one reel and when the winding and distributing mechanism bears a predetermined relation with respect to the reel to automatically disassociate it from the reel previously being wound and transfer it to an empty reel without causing any cessation in the operation of the winding and distributing mechanism.

The invention will be more fully understood from the following description taken with the accompanying drawings, wherein Fig. 1 is a side elevation of the mechanism;

Fig. 2 is a plan view of the mechanism shown in Fig. 1;

Fig. 3 is a fragmentary vertical section taken on the line 3—3 of Fig. 2;

Fig. 4 is a section taken on the line 4—4 of Fig. 3;

Fig. 5 is a section taken on the line 5—5 of Fig. 3;

Fig. 6 shows more clearly a portion of the mechanism;

Fig. 7 is a section taken on the line 7—7 of Fig. 5;

Fig. 8 is a section taken on the line 8—8 of Fig. 5;

Fig. 9 is a section taken on the line 9—9 of Fig. 3;

Fig. 10 is a section taken on the line 10—10 of Fig. 3;

Fig. 11 is a section taken on the line 11—11 of Fig. 1 looking in the direction of the arrows;

Fig. 12 is a section taken on the line 12—12 of Fig. 11;

Fig. 13 is a section taken on the line 13—13 of Fig. 11; and

Fig. 14 is an enlarged view showing more clearly a detail of the mechanism.

Referring now to the accompanying drawings wherein like numerals are employed to designate similar members throughout the several views, the numeral 20 refers generally to the main frame of the mechanism, a portion of the main frame 20 (Fig. 3) together with an end plate 21 and a plug 22 forms the base on which the entire mechanism rests. A bearing bracket 25 is positioned in an aperture in the main frame 20 and supports a bearing member 26 in which a driving shaft 27 is rotatably journaled, the driving shaft 27 leading to a suitable source of power, such as an electric motor 28. A gear 30 (Fig. 3) is keyed to one end of the shaft 27 and meshes with a beveled gear 31 which is rotatably mounted upon the hub portion of a beveled gear 32, the function of which gear 32 will be referred to hereinafter. A pinion gear 33 which is keyed to the hub on the gear 31 meshes with another pinion gear 34 keyed to a shaft 36, suitable bearings, such as a ball bearing 37, being provided to permit free movement of the shaft 36.

Referring now particularly to Fig. 3, the lower portion of the shaft 36 is equipped with an endless screw thread indicated at 38 which engages a projection 39 on a portion of a radial arm casting 41 which is caused thereby to travel up and down upon the shaft 36 as this shaft is rotated. A cylindrical guard 40 for the endless screw thread 38, is suitably secured to the casting 41 as shown. A quill 42 is caused to rotate with the shaft 36 by means of a key 43 which rides in an elongated keyway 44 in the shaft 36. A spring cup 45 is forced against a beveled gear 46 by the action of a spring 47, the tension of which is adjusted by a spring adjusting nut 48 which is screwed on the quill 42 and is prevented from turning by a locknut 49. In this manner, as indicated particularly in Fig. 3, the beveled gear 46 is driven frictionally by its engagement between the spring cup 45 and the flanged portion of the quill 42.

The beveled gear 46 engages a beveled gear 51 which is secured to a horizontal shaft 52 carrying a beveled gear 53 (Fig. 1) which is suitably secured thereto. A hollow shaft 55 supported in suitable bearings in the radial arm casting 41 (Fig. 1) is integral with a flyer arm 56 (Figs. 1 and 2) to which it imparts a revolving motion by the engagement of a beveled gear 57 which is keyed to the hollow shaft 55 with the beveled gear 53 driven as described by the shaft 52. A strand 60 which is being taken up by the mechanism, passes over a guide pulley 61 which is suitably secured to a bracket 62 which will be referred to more in detail hereinafter, around a sheave member 63 which will also be referred to hereinafter, and finally over sheaves 65, 66, 67 and 68 where it is served to a reel or spool 69 or 70, depending on the position of the arm 41. A suitable joint 71 permits rotation of a bifurcated mounting member 72 for the sheave 68 to permit rotation thereof so that the strand 60 will always be served to the spool at the proper angle.

The mechanism described in the preceding paragraphs functions to serve the strand to an individual spool where it is not desirable or necessary that the spooling be uninterrupted. The remaining portions of the mechanism having the function of automatically shifting the mechanism continuously from one spool to another when a predetermined length of material has been spooled, so that there is no interruption in the spooling action.

Referring now particularly to Fig. 3, a clutch 80 is disposed in relationship to the shaft 27 so as to be rotated therewith but may slide thereon when actuated by a collar 81 which is integral with a clutch arm 82 sliding in a bearing bracket 83. The manner in which the clutch arm 82 is caused to function will be explained in a later paragraph. A backward movement of the clutch 80 causes it to engage a clutch member 85 which is keyed to a beveled gear 86 meshing with a segmentary gear 87 suitably secured to a plate 88 which is keyed to an upright shaft 89 having its lower portion journaled in a thrust bearing 91 and rotatably secured at its upper portion by a top cap 90 (Figs. 1, 11 and 12) which is suitably secured to the main frame 20. A forward movement of the clutch 80 (Fig. 3) causes it to engage a toothed portion on the bearing member 26, the bearing member 26 in this manner functioning as a clutch member to co-operate with the clutch 80. A beveled gear 92 is keyed to the clutch member 26 and meshes with the beveled gear 32 which is keyed to the shaft 89 at 93.

It is readily seen that the plate 88 and radial arm 41 and all of the mechanism secured thereto is caused to swing to the right or to the left by the action of the clutch 80 in engaging either the clutch member 85 or the bearing member 26. This mechanism is caused to function when a predetermined length of strand has been wound upon a single spool. The manner in which this is accomplished and the mechanism performing this function will now be described.

The strand 60 passing around the sheave member 63 causes a rotation of this member in the direction indicated by the single horizontal arrow in Fig. 1. The sheave member 63 is keyed to a bushing 95 (Figs. 12 and 13) having integral therewith an intermittent gear pinion 96, the bushing 95 being free to revolve upon an upper portion of the shaft 89, a bearing 97 facilitating the rotating motion thereof. The gear pinion 96 drives an intermittent gear 98 rotatably secured to a stud-shaft 99, and the gear 98 has secured thereto an intermittent gear pinion 100 which revolves with it. An intermittent gear 101 (Fig. 13) rotatably mounted upon a stud 102 meshes with the gear pinion 100 and carries with it an intermittent gear pinion 103 which is secured to it and which is also mounted upon the shaft 102. The gear pinion 103 meshes with an intermittent gear 104 which causes to rotate with it a small pinion gear 105, both of these gears being secured to the shaft 99 as shown in Fig. 12. A stationary spur gear 107 is keyed to the shaft 89 and meshes with the pinion gear 105. The motion imparted through the train of gears to the small gear 105, therefore causes this gear to function as a sun gear and its rotation around the stationary gear 107 obviously carries the entire assembly with it. The train of gears is enclosed in a housing 110 which is rotatably journaled in the extreme upper portion of the shaft 89 and is equipped with a plurality of pegs 111. The rotation of the housing 110 eventually causes one of the pegs 111 to ride underneath a shoe 112 secured to a tube 113 (Fig. 14) which is slidable in the bracket 62. A rod 115 extends through the tube 113 and is supported by a coil spring 116 which is positioned between the shoe 112 and a washer 117 which is confined by a nut and locknut 118 and 119 respectively. A bell crank arm 121 having a roller 122 secured to its free end is pinned to the tube 113. A plunger 123 actuated by a spring 124 bears against a shoulder on the bell crank arm 121, thus tending to force this member together with the tube 113 to which the bell crank arm is rigidly secured in a counter clockwise direction, the rotation of these members however being stopped by the shoe 112 which is also secured to the tube 113, bearing against the side of the housing 110. At required intervals the bell crank arm 121 may be associated with the top cap 90 in a manner and for a purpose which will be described in a later part of the specification.

The tube 113 is also held in its greatest possible downward position by the action of a spring 126 which bears against the bell crank arm 121 and is held in position by a spring cup which is formed integral with the bracket 62 as shown particularly in Fig. 13. The rod 115 extends through a second tube 130 and has a pin 131 inserted in its extreme lower end. A cam arm 132 is keyed to the tube 130 and has a finger 133 which rides in a cam groove in a cam 134 which is secured to the shaft 52 and revolves with it. A clutch member 136 is pinned to the tube 130 through an elongated aperture in the tube in such a manner as to have a possible up and down motion thereon but no reciprocating motion except with the tube. A flanged bushing 137 is held in a projection of the radial arm casting 41 and supports the tube 130 which is journaled on the interior portion thereof. An upper clutch member 138 is keyed to the bushing 137 and is provided with a pair of arms in which pins 140 and 141 are secured, the extent to which these pins project being regulable as shown particularly in Fig. 4 by nuts 142 and 143 respectively.

The entire mechanism can be in any one of two positions as indicated in the plan view shown in Fig. 2. When the mechanism is in this position the parts are placed in respect to each other in the manner shown in full in the various sectional views, and the dotted positions represent the location of the various parts when the mechanism is in the position indicated by the dotted lines in Fig. 2.

Referring now particularly to Fig. 4 and the various sectional views taken thereon, a locking of the upper clutch member 138 causes the pin 140 to engage a finger 145 on a lever 146 keyed to a stud shaft 147 which is journaled in the main frame 20 and is held against lateral movement by a hub portion of the lever 146 and an arm 148. A coil spring 150 (Fig. 7) having one end suitably secured to the main frame 20 and the other end secured to the free end of the arm 148 pulls this arm against the hub portion of a lever 151 where a projection on the arm 148 engages a slot which is provided on the hub of the lever 151. The lever 151 is movably positioned on a shaft 152 which is rotatably journaled in the main frame 20, and has a coil spring 153 secured to its free end, the coil spring being secured between the lever 151 and an upright 154. As shown particularly in Fig. 7 the spring 153 tends to pull the lever 151 in a clockwise direction, but is prevented from doing so by the locking action of the arm 148. A ring member 156 pinned to the shaft 152 co-operates with the hub of the lever 151 to form a clutch whereby clockwise motion of the lever 151 will cause a similar movement of the shaft 152 but allows sufficient clearance to permit a lost motion action so as to let the shaft 152 revolve in an opposite direction when the function of the mechanism requires it.

The rotation of the shaft 152 carries with it a plate 158 which is secured to the shaft 152 by a pin 159 and the plate 158 through the action of two fingers 160 and 161, which are secured pivotally to it, forces a safety lever 163 out of engagement with a slotted portion of the plate 88 against the action of a spring 164. The safety lever 163 is mounted on a shaft 165 which is suitably secured to the main frame 20 and has a safety action which will be described more in detail later. The motion of the plate 158 causes a movement of the clutch arm 82 through a pin 166 which is integral with a portion of the plate 158 and engages a slotted portion in the clutch arm 82. The motion of the clutch arm 82 is transmitted to the clutch 80 in the manner described in a preceding paragraph.

When the mechanism is in the position as shown by the dotted lines particularly in Fig. 4, motion of the clutch member 138 causes the pin 141 to engage a finger 170 integral with a lever 171 which is secured to a small shaft 172. The motion of the lever 171 causes a rotation of the shaft 172 (Fig. 8) which carries integral with it a dog lever 173 which is normally held in engagement with an arm 174 by a plunger 175 which is actuated by a spring 176. The arm 174 is movably positioned upon the shaft 152 and co-operates with a member 178 which is keyed to the shaft 152 to form a clutch, by means of which the shaft 152 can be rotated when the arm 174 is actuated by a spring 177 which is secured to it and to a short upright 179 which is screwed in the end plate 21.

It is to be noted that the arm 151 and the arm 174 each cause a rotation of the shaft 152, but since the arm 151 is projecting upwardly and the arm 174 downwardly an opposite rotation of the shaft takes place in each case. Due to the opposite motion of the shaft 152 through the plate 158 and clutch arm 82 causes a motion of the clutch 80 to engage it with the member 85 or the member 26 depending upon in which direction the shaft 152 is rotated and upon the direction in which the shifting of the mechanism is to take place. As the mechanism is shifted from one reel position to another, the parts associated with the shaft 152 are returned to their normal position by the action of projecting pins 180 and 181 which are suitably secured in the plate 88.

The safety lever 163 is returned to its normal position by the action of the spring 164, the pressure of the finger 160 or 161, as the case may be, being relieved by the returning of the shaft 152 to its normal position. The safety lever 163 is normally prevented from becoming displaced accidentally because the latch 182 which is pivoted on the safety lever 163 is forced behind a projection in the plate 88 by the action of a coil spring 183. A latch releasing member 185 is provided for each position which the safety lever 163 may have, the latch releasing member being actuated by a downwardly projecting member 186 which is secured to the radial arm casting 41, means being provided as shown particularly in Fig. 3 for adjusting the length of the downwardly projecting member 186. Suitable means is provided for returning the latch releasing member 185 to its normal position, wherein its end portion is in line with the beveled end of the downwardly projecting member 186. As shown in the drawings and described, the safety lever 163 together with associated apparatus prevents the mechanism from shifting from one reel to another except when it is at its extreme lower position.

The operation of the mechanism is as follows: A plurality of reels are secured in a horizontal position as shown in Figs. 1 and 2, and the strand which is to be served to them is brought over the guide pulley 61 around the sheave member 63 over pulleys 65, 66, 67 and 68, and initially secured to the hub of the reel 69. The motor is started thus turning the shaft 27 which causes a rotation of the arm 56 through gears 30, 31, 33 and 34, the shaft 36 and the gears 46 and 51, the shaft 52 and gears 53 and 57 respectively. Since the strand 60 is fed at a normal uniform rate, means must be provided for taking it up on the reel 69 at a uniform rate, the obvious difficulty encountered being that when the diameter upon which the strand is being wound changes the rate of application of the strand will normally be faster. A flexibility is permitted in the present case by the slipping of the gear 46 between the members 42 and 45 as described in a preceding paragraph. Since the up and down motion of the radial arm 41 is uniform and continuous, as the reel becomes fuller the spacing of successive convolutions is different for each layer of strand upon the reel.

The pegs 111 having been placed in a predetermined position upon the housing 110 when the required number of feet of the strand 60 has been wound upon the reel 69, one of the pegs 111 will ride under the shoe 112 thereby raising the rod 115 and engaging the two clutch members 136 and 138 in the manner described. This, by means of the parts described, causes a partial rotation of the shaft 152 to cause an engagement of the clutch 80 to swing the entire mechanism to the next reel position in the manner described above. When the reel 69 (Fig. 2) has been filled the mechanism shifts to begin winding the strand 60 upon the reel 70, and the roller 122, on the bell crank arm 121 (Fig. 11), rolls on the tip of the top cap 90 thereby forcing the bell crank arm in a direction away from the housing 110. The shoe 112 being pinned to the tube 113 to which the bell crank arm 121 is also secured is therefore pulled off of the peg 111 thus allowing the rod 115 to drop to a lower position aided by the springs 125 and 116. This prevents a reshifting of the mechanism on its next downward travel which would otherwise take place because the slowness with which the housing 110 rotates would permit the shoe 112 to remain in engagement with the peg 111 for a considerable length of time. If the shoe 112 is raised when the members 138 and 136 are in such a position that they cannot come into engagement, the tube 113 will be raised against the action of the spring 116 and the rod 115 will then be raised when the position of the members 138 and 136 permits, by the uncoiling of the spring 116.

The shifting from one reel to another can take place only when the flyer 56 is in a desirable position. The drive from the gear 57 to the flyer 56 is direct and the cam 134 is driven directly by the shaft 52 to which it is mounted. This results in the flyer 56 and the cam arm 132 being always in the same relative position with respect to each other. Since the cam arm 132 directly causes the shifting of the mechanism by transmitting an impulse to the clutch member 138 when the clutch has been closed by the raising of the rod 115, it follows that the shifting will take place only when the flyer 56 is in a definite position with respect to the reels. The center of the flyer 56 coincides with the center of the shaft 52 when the shifting takes place, the flyer 56 being directly under the shaft 52 when shifting from reel 69 to reel 70 takes place, and its farthest extended position when the shifting action is from reel 70 to reel 69. During the shifting, the flyer 56 ceases to rotate because the shifting takes place at the same speed at which the strand 60 is fed to the spooling mechanism. When the shifting takes place the slippage of the beveled gear 46 permits the flyer to remain in the same position during the entire shifting.

Although specific reference has been made throughout the description to a particular construction and a definite association of parts, it is to be remembered that the invention may be embodied in a variety of mechanical forms. The invention, therefore, is to be limited only by the scope of the appended claims.

What is claimed is:

1. In a material reeling mechanism, a support for a plurality of material receiving reels, a flyer arm for winding the material on a reel mounted on the support, means for shifting the flyer arm to another reel on the support, and means for causing the shifting to occur when the flyer arm is in a predetermined position.

2. In a material reeling mechanism, a support for a plurality of material receiving reels, a rotating flyer for winding material on a reel mounted on the support, means for shifting the flyer to another reel mounted on the support, and means to prevent a rotation of the flyer during the shifting operation.

3. In a material reeling mechanism, a support for a material receiving reel, a single means for guiding material to and winding it upon a reel mounted on said support, material measuring means actuated by the material being wound, and means actuated thereby when a predetermined amount of material has been measured for removing the first mentioned means from operative association with the reel.

4. In a material reeling mechanism, a support for a reel, means for winding material on a reel mounted on the support, and means for stopping the winding operation with respect to the reel when a predetermined amount of material has been wound on the reel comprising a housing rotated by the material being wound, a projection on the housing, a shoe for engaging the projection as the housing is rotated, and a clutch operated by the engagement of the shoe with the projection to actuate the stopping mechanism.

5. In a material reeling mechanism, a stationary support for a reel, a flyer arm, means for rotating the flyer arm around the periphery of a reel mounted upon said support to guide material to and wind it upon the reel, and means actuated by a predetermined set of conditions for removing the arm from operative association with the reel.

6. In a material reeling mechanism, a support for a reel, a flyer arm, means for rotating the arm around the periphery of a reel mounted upon said support to guide material to and wind it upon the reel, means for reciprocating the arm along the axis of the reel to distribute the material being wound on the reel, and means actuated when a predetermined amount of material has been wound on the reel to remove the arm from operative association with said reel.

7. In a material reeling mechanism, a support for the material receiving reel, a flyer arm, means for rotating the arm around the periphery of a reel mounted upon said support to guide material to the reel and to wind it thereon, material measuring means actuated by the material being wound, means actuated thereby when a predetermined amount of material has been measured after removing the arm from operative association with the reel, and means associated with the measuring means to vary the amount of material necessary to be measured before the arm is removed from its operative association with the reel.

8. In a material reeling mechanism, a support for a plurality of material receiving reels, a single means for guiding material to and winding it upon a reel mounted on said support, and means actuated by a predetermined set of conditions for transferring the first mentioned means into operative association with another reel mounted upon said support.

9. In a material reeling mechanism, a support for a plurality of material receiving reels, a single means for guiding material to and winding it upon a reel mounted on said support, means for reciprocating the first mentioned means to distribute the material upon the reel during the winding thereof, and means actuated when a predetermined amount of material has been received upon the reel for transferring the first and second mentioned means into operative association with another reel mounted upon said support.

10. In a material reeling mechanism, a support for carrying a plurality of stationary reels in a plurality of reel positions, a flyer capable of being shifted to wind material on the reels in their respective positions, and means for reciprocating the flyer axially of a reel in any of the reel positions.

11. In a material reeling mechanism, a support for a plurality of material receiving reels, a flyer for winding the material on a reel mounted on the support, means for reciprocating the flyer axially of the reel to distribute the material on the reel, means for shifting the flyer to another reel on the support, and means for causing the shifting to occur when the flyer is in a predetermined axial position.

In witness whereof, I hereunto subscribe my name this 25th day of June A. D., 1925.

HELGO WIGGO JESPERSEN.